(12) United States Patent
Schwemmlein et al.

(10) Patent No.: US 10,988,866 B2
(45) Date of Patent: Apr. 27, 2021

(54) ELECTROMOTIVELY OPERATING DEVICE FOR FORMING A LENO SELVEDGE FOR A LOOM AND A PROJECTILE LOOM HAVING SUCH A DEVICE

(71) Applicant: Gebrüder Klöcker GmbH, Borken-Weseke (DE)

(72) Inventors: Christoph Schwemmlein, Borken-Weseke (DE); Kurt Hockemeyer, Borken-Weseke (DE)

(73) Assignee: GEBRÜDER KLÖCKER GMBH, Borken-Weseke (DE)

( * ) Notice: Subject to any disclaimer, the term of this patent is extended or adjusted under 35 U.S.C. 154(b) by 157 days.

(21) Appl. No.: 16/071,363

(22) PCT Filed: Jan. 16, 2017

(86) PCT No.: PCT/EP2017/050819
§ 371 (c)(1),
(2) Date: Jul. 19, 2018

(87) PCT Pub. No.: WO2017/125357
PCT Pub. Date: Jul. 27, 2017

(65) Prior Publication Data
US 2020/0048797 A1      Feb. 13, 2020

(30) Foreign Application Priority Data
Jan. 19, 2016    (EP) ..................................... 16151828

(51) Int. Cl.
*D03C 7/04*   (2006.01)
*D03C 7/08*   (2006.01)
*H02K 15/02*  (2006.01)

(52) U.S. Cl.
CPC ................. *D03C 7/04* (2013.01); *D03C 7/08* (2013.01); *H02K 15/02* (2013.01)

(58) Field of Classification Search
CPC ............. D03C 7/00; D03C 7/04; D03C 7/005
See application file for complete search history.

(56) References Cited

U.S. PATENT DOCUMENTS 5,518,039 A * 5/1996 Haeussler ................ D03C 7/04
139/50
5,973,430 A * 10/1999 Brunet ..................... B23Q 1/70
310/90.5
(Continued)

FOREIGN PATENT DOCUMENTS

DE          4405776 C1    8/1995
DE         19902370 A1    8/2000
(Continued)

*Primary Examiner* — Khoa D Huynh
*Assistant Examiner* — Erick I Lopez
(74) *Attorney, Agent, or Firm* — Dinsmore & Shohl LLP

(57) ABSTRACT

The invention relates to an electromotively operating device (1) for forming a leno selvedge, comprising a rotor (10) having two thread-guide eyelets (14) arranged diagonally opposite each other in the rotor (10) for the leno threads, and a stator (30) accommodating the rotor (10). The rotor (10) has a magnetic disk (16), wherein the magnetic disk (16) has a plurality of alternately positive and negative magnetized segments (17), which are oriented in an axial direction of the rotor (10).

12 Claims, 4 Drawing Sheets

(56) References Cited

U.S. PATENT DOCUMENTS

| | | | | |
|---|---|---|---|---|
| 6,006,793 | A * | 12/1999 | Krumm | D03C 7/04 139/54 |
| 6,102,082 | A * | 8/2000 | Hehle | D03J 1/08 139/302 |
| 6,246,147 | B1 * | 6/2001 | Hockemeyer | D03C 7/04 310/267 |
| 6,286,560 | B1 * | 9/2001 | Schwemmlein | D03C 7/04 139/54 |
| 6,308,742 | B1 * | 10/2001 | Peulen | D03C 7/04 139/54 |
| 8,590,578 | B2 * | 11/2013 | Schwemmlein | D03C 7/06 139/35 |
| 2004/0135444 | A1 * | 7/2004 | Choi | H02K 5/1677 310/81 |
| 2008/0018189 | A1 * | 1/2008 | Dooley | H02K 1/165 310/156.01 |
| 2010/0225195 | A1 * | 9/2010 | Asano | H02K 21/24 310/216.067 |
| 2011/0210626 | A1 * | 9/2011 | Schmidt | H02K 1/146 310/46 |
| 2013/0187489 | A1 | 7/2013 | Numaguchi et al. | |
| 2014/0354107 | A1 * | 12/2014 | Alfermann | H02K 1/185 310/216.113 |
| 2015/0015174 | A1 | 1/2015 | Atmur | |
| 2017/0121866 | A1 * | 5/2017 | Hockemeyer | H02K 5/04 |

FOREIGN PATENT DOCUMENTS

| | | |
|---|---|---|
| DE | 19733261 C2 | 7/2001 |
| EP | 839219 B1 | 6/1999 |
| EP | 1050437 A2 | 11/2000 |
| EP | 1019571 B1 | 12/2002 |
| EP | 2012408 A1 | 1/2009 |
| WO | 2010048928 A2 | 5/2010 |

* cited by examiner

ELECTROMOTIVELY OPERATING DEVICE FOR FORMING A LENO SELVEDGE FOR A LOOM AND A PROJECTILE LOOM HAVING SUCH A DEVICE

CROSS-REFERENCE TO RELATED APPLICATION

This application is the U.S. national stage of PCT/EP2017/050819, filed Jan. 16, 2017, which claims priority of European Patent Application no. EP 16 151 828.7, filed Jan. 19, 2016 which is hereby incorporated by reference in their entirety.

FIELD OF INVENTION

The invention relates, on the one hand, to an electromotively operating apparatus for forming a leno selvage, in particular for a loom, and, on the other hand, to a projectile loom having said apparatus.

BACKGROUND OF THE INVENTION

Such an electromotively operating apparatus for forming a leno selvage comprises a rotor having two thread guiding eyes for the leno threads arranged diagonally opposite one another in the rotor and a stator receiving the rotor, wherein the stator has a spool holder, wherein the spool holder accepts a plurality of spools, and wherein the apparatus comprises a control.

Apparatus for forming a leno selvage, in particular for shuttleless looms, comprising an electric motor having a rotor are known from the prior art, wherein the rotor has at least two guide elements spaced apart from one another for the leno threads for forming the leno selvage with the corresponding weft threads. An apparatus is known from DE 44 05 776, for instance, in which an electrically controllable actuating motor is provided which drives a selvage disk, wherein the selvage disk forms the rotor of the electrically controllable actuating motor. The stator itself is attachable to the loom by a support part, and indeed preferably in a free space disposed between the longitudinal strut before the first heddle shafts of the loom s. Provision is made in detail in this respect that the leno disk which forms the rotor of the electrically controllable actuating motor has as guide elements two openings for the leno threads, the openings being arranged opposite one another. This known rotary leno selvage of a loom now works such that it carries out a few revolutions in the one direction and in so doing binds off a weft thread after at least half a respective revolution. A full leno selvage is thus produced here. On the side of the feed of the two leno threads, said leno treads twist in accordance with the number of revolutions of the selvage disk such that a reversal of the direction of rotation is indicated to cancel this twist, that is the leno disk consequently has to rotate in exactly the opposite direction. The number of revolutions in each direction must in this respect be the same on average over time. If no reversal of the direction of rotation were made, the leno threads would tear at some point due to the increasing tension as a result of the increasing twisting.

A similar rotary leno selvage having an electromotive drive is known from DE 19733261 C2, wherein this motor works in the manner of a servo motor. A measurement of the rotational angle for the purpose of detecting a defined angular position of the leno disk is provided to this extent to bind the rotation of the leno disk with the shed opening of the loom. This means that the leno disk carries out a continuous movement coordinated with the speed with respect to the stroke movement of the heddle shafts toward the shed opening or toward the shed closing of the loom.

A so-called propeller leno is now known from EP 839219 B1. Such a propeller leno is characterized by two arms arranged diagonally opposite at the rotor of an electric motor and thus by a small moved mass so that, as is described in EP 1019571 B1, such a propeller leno is controllable independently of the movement of the heddle shafts. This means that the acceleration of the propeller leno is such that, at the time of the start of the opening of the weft insertion, the arms of the propeller leno having the eyes which are arranged at the end side and through which the leno threads run have already raised the shed. The propeller leno is thus controlled independently of the shaft. This means that it is ensured by the known propeller leno that at the start of the weft insertion of the leno selvage apparatus, the two leno threads are in the position "shed open" and the leno threads are moved directly into the closed position of the shed after the end of the weft insertion. It is thus only important that the respective end position, that is shed open or shed closed, is achieved by the apparatus at the latest when the heddle shafts have adopted a corresponding position. This means that a movement procedure synchronous for any point in time of the movement of the rotor of the electric motor with the movement of the heddle shafts is not required.

It is additionally known to provide a so-called cutting lane in looms having long warp beams in the fabric. The fabric is divided in this respect, wherein two leno selvage apparatus are provided in the region of the cutting lane to prevent a rippling of the fabric in order to prepare a leno selvage at each side. The arrangement of one or more propeller lenos in the cutting lane has the disadvantage, however, that, because said propeller leno has a broad construction, the cutting lane is correspondingly wide, which means that "fabric is lost".

To keep the cutting lane as small as possible, it is still endeavored in this respect to use electromotively operating apparatus of the initially named kind that are relatively slim in construction and that have a comparatively large diameter. They have to be slim because two of these apparatus have to be arranged in one cutting lane and the space requirements can be minimized to this extent. Large in diameter means that the thread guiding eyes for the leno threads should have a comparatively large spacing, which has the consequence that the shed raised by the apparatus is comparatively large so that it is always ensured that the weft thread does not catch in the shed raised by the leno threads.

SUMMARY OF INVENTION

An electromotively operating apparatus for forming a leno selvage that is slim in design to minimize the space requirements in the region of the cutting lane is characterized in accordance with the invention in that the rotor has a magnetic disk, wherein the magnetic disk has a plurality of alternately positively and negatively magnetized segments. The magnetic disk itself has a thickness of approximately 1 mm. It is hereby achieved that the electromotively operating apparatus has a slim construction overall, that is a diameter to width or length ratio of 4.3/1 can be achieved. The alignment of the magnet segments is axial here, that is an axial magnetic flux takes place.

It has furthermore been found to be disadvantageous that there is the risk due to production tolerances that the rotor oscillates during the rotational movement in the stator receiving it. At higher revolutions, that is at revolutions of 300 picks a minute and more, it is possible that the drive moves into resonance. If the electromotively operating apparatus is configured in the manner of a stepper motor, there is the risk of so-called step losses as a consequence thereof. This means that the angle of rotation that should be achieved from a technical control aspect to raise the shed to a maximum height cannot be reached. If the shaft can therefore not be completely opened, this has the consequence that the weft thread may catch in the shed on the introduction of the weft thread. If step losses have occurred, the electromotively operating apparatus has to be readjusted, which means that the drive is moved to its reference position, that is to the starting point or to the starting position for the rotor from where onward the counting of the steps takes place in an adding or subtracting manner depending on the direction of rotation. This is associated with a comparatively large time effort so that ways have to be looked for to avoid such an oscillation of the rotor of the electromotively operating apparatus in the stator.

It has already been pointed out in this connection that the electromotively operating apparatus has spools. It has now been found that if the number and arrangement of the spools in the spool holder is selected such that the tilt moments exerted on the rotor by the spools are canceled when two or more spools have current applied at the same time and identically.

If, in accordance with a first embodiment, the spool holder has four spools, with a respective two spools forming a spool pair being arranged diagonally, that is at an angle of 180°, opposite one another in the spool holder and if the spools of a spool pair can have current applied at the same time and in an identical manner, such an oscillating movement of the rotor such as has been described above does not occur since the moments generated by the spools on the rotor cancel one another and the rotor thus has no force effect in the axial direction of the apparatus. This means that the rotor is centered in its motion; tilt moments are thus not exerted on the rotor. Provision can be made in detail in this respect that the two spools of a spool pair that can have current applied at the same time in an identical manner are connected together electrically, that is, they are, for example, connected in parallel or in series, or alternatively thereto a control is provided, with the current application to the spools of a spool pair taking place by such a control in an identical manner, as described above.

A second embodiment is characterized in that the spool holder accommodates six spools, with a respective three spools arranged at an angle of 120° with respect to one another being able to have current applied at the same time in an identical manner. An oscillating movement of the rotor such as has been previously described can also be avoided by such an arrangement since the moments on the rotor generated by the spools also cancel each other out here. This means that the rotor is also centered in its motion here; tilt moments are not exerted on the rotor. To apply current to the spools at the same time and in an identical manner, they can be connected in series or in parallel to this extent. Alternatively, a control can also be provided here, with the current application taking place at the same time and in an identical manner by the control of the respective three spools arranged at an angle of 120° with respect to one another.

A cancellation of the moments formed on the rotor can also take place using eight spools in the spool holder when, as also with four spools, a respective two spools disposed diagonally opposite one another have current applied at the same time and in the same manner.

This means that irrespective of in accordance with which embodiment, the axial forces which occur in an unwanted manner perpendicular to the plane of the drawing due to the respective arrangement of and current application to the spools add up to zero so that oscillating moments on the rotor exciting resonances are avoided.

However, an embodiment with four spools can be more advantageous to this extent since it works with lower losses than one with six or eight spools since the number of magnetically inactive intermediate spaces between the spools is smaller than with six or eight spools.

To optimize the microstep capability of a stepper motor as an electromotive drive, an offset of a fraction of the normal angular distance is provided. In addition, a respective half of the yokes of a pole are provided with a negative sign of the angular offset and the other half is provided with a positive sign of the angular offset. In other words, this means that one respective half is displaced to the left by, for example a ¼ pole pitch and the other half is displaced to the right by, for example a ¼ pole pitch. A smoothing of the torques hereby takes place, which accommodates an operation in microstep mode.

The damping of resonances is likewise of decisive importance for the operation in microstep mode since step losses can in particular be avoided at critical speeds by the excitation of the oscillatory system. For step losses always have the consequence that the leno shed cannot be raised up to the full size, which can furthermore have the consequence that the weft thread cannot be properly introduced into the shed.

Provision is furthermore made that the spools are formed in kidney shape to enable a circular design of the spool holder.

It has been found to be particularly advantageous that the spool holder of the stator is formed from an electrically non-conductive material, in particular from a plastic, to reduce eddy currents, with provision additionally being made in accordance with a further feature of the invention that the plastic is of high strength to avoid deformation of the motor during the operation even at higher temperatures; weight can furthermore also be saved by the use of plastic. The use of a plastic having the name PEEK (polyether ether ketone) has proved to be particularly advantageous.

It has been found to be particularly advantageous that if the rotor has a collet for receiving the magnetic disk and a bearing, the collet has the two thread guiding eyes disposed diagonally opposite one another to guide the leno threads. To reduce the wear in the thread guiding eyes by the leno threads, provision can furthermore be made to arrange inserts for wear protection in the thread guiding eyes.

The bearing can be formed as a roller element bearing, in particular as a ball bearing, to enable a low-wear motion of the rotor.

The invention also relates to a projectile loom having at least one cutting lane for dividing the fabric web which is also characterized in accordance with the invention that at least one apparatus, preferably two apparatus, in accordance with one or more of claims 1 to 9 is/are arranged in the cutting lane. The warp beam can in this respect be configured as continuous.

BRIEF DESCRIPTION OF THE DRAWINGS

The invention will be described in more detail below by way of example with reference to the drawings.

DETAILED DESCRIPTION OF THE PREFERRED EMBODIMENT

Figure 1:
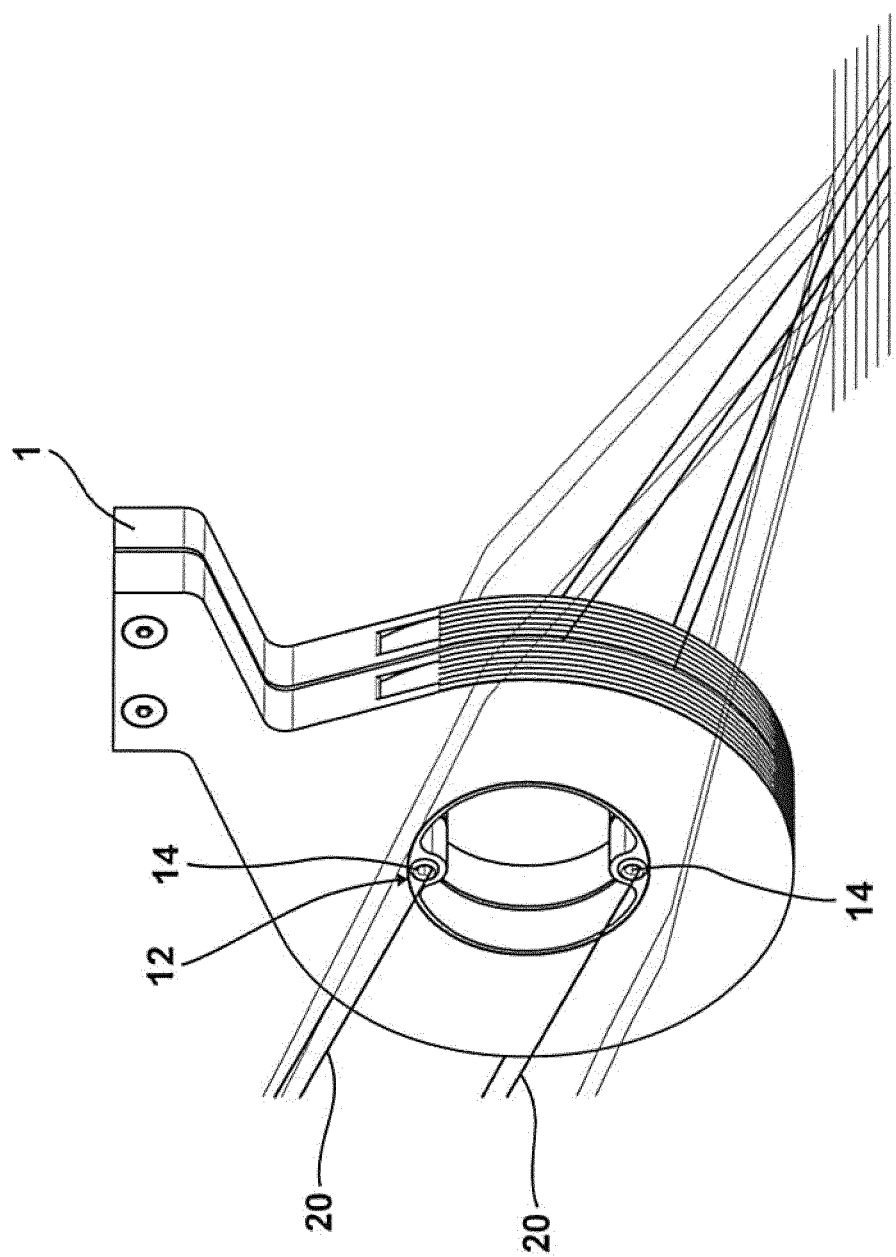
FIG. 1 shows two electromotively operating apparatus for forming a respective leno selvage with an indicated fabric in a perspective representation.

In accordance with FIG. 1, two apparatus 1 are shown for forming a respective leno selvage each, wherein a slight distance is provided between the two apparatus to guide the leno threads 20, which are guided by the thread eyes 14, in the direction of the weft beam.

Figure 2:
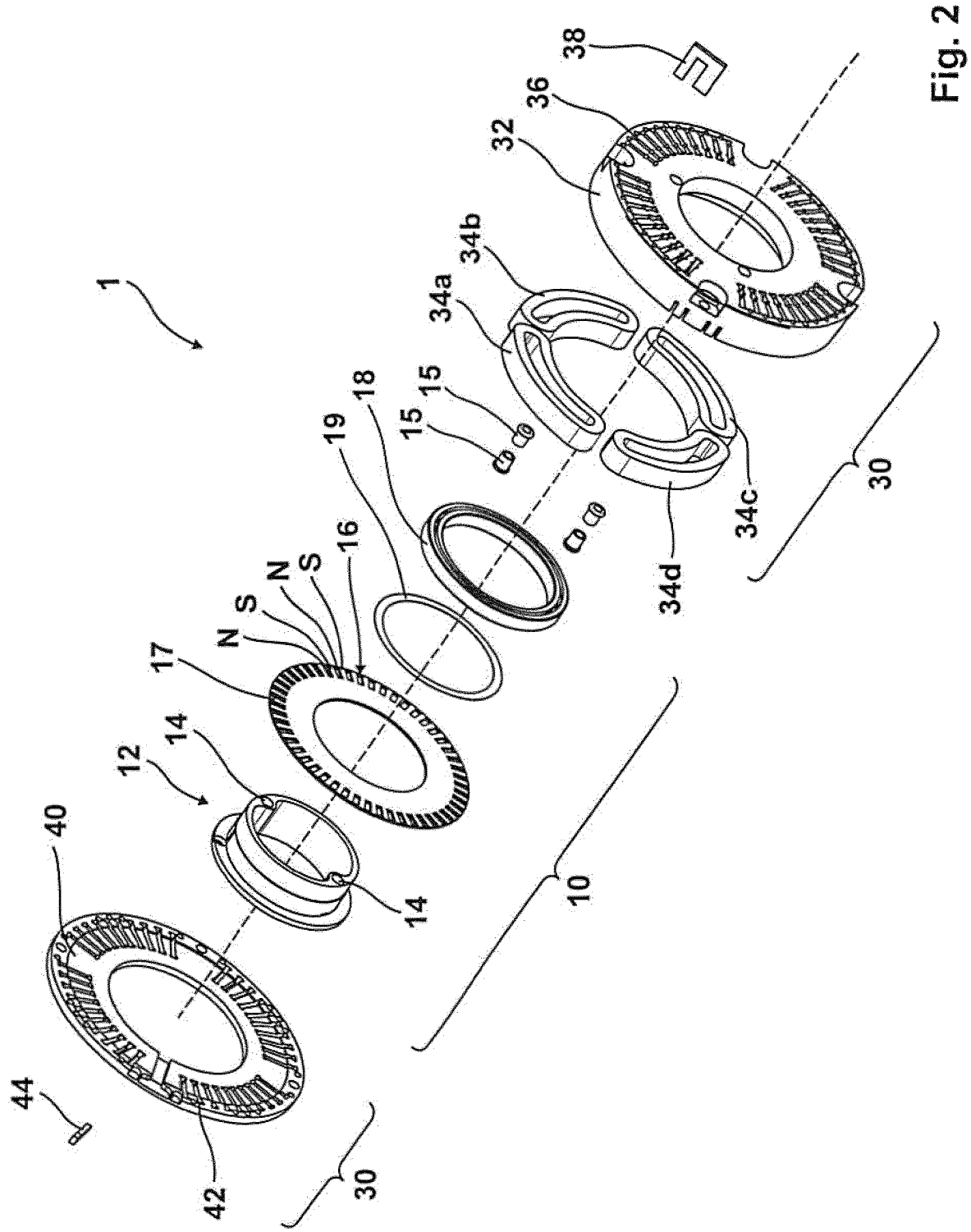
FIG. 2 shows the apparatus in accordance with the invention for forming a leno selvage in an exploded representation.
Figure 3:
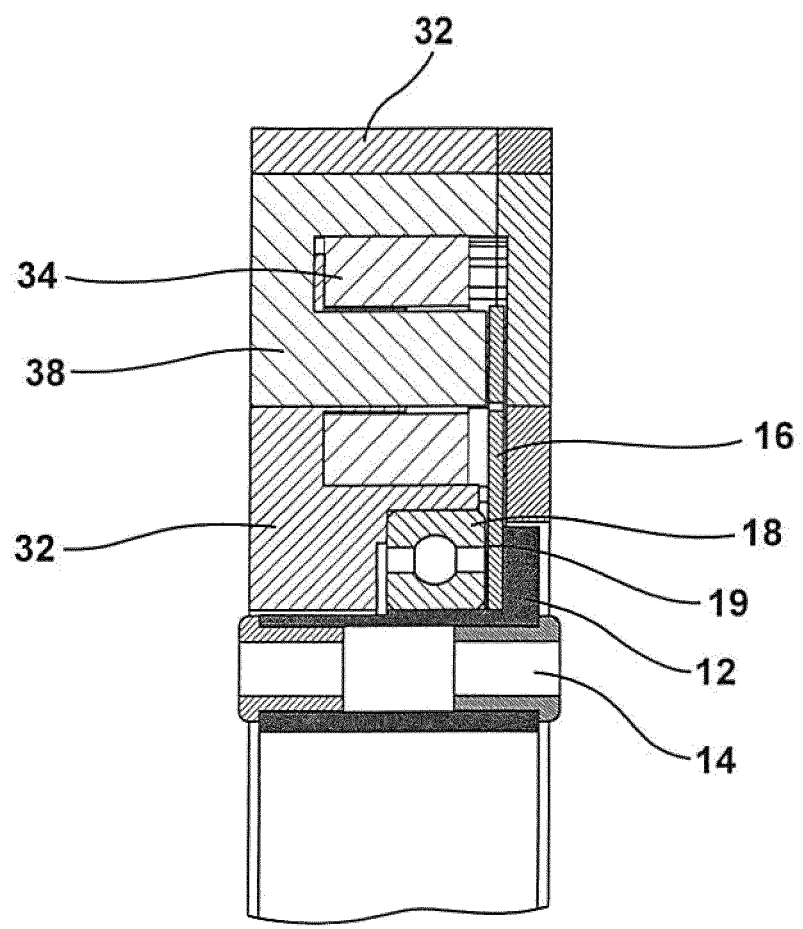
FIG. 3 shows a half-section through the apparatus in accordance with the invention for forming a leno selvage in accordance with FIG. 2.

The subject of the invention is now in accordance with a first embodiment the configuration of the electromotively operating apparatus for forming a leno selvage in accordance with FIGS. 2 and 3. The apparatus shown in the form of an exploded drawing in FIG. 2 for forming a leno selvage comprises the components of a rotor 10 and of a stator 30 receiving the rotor 10. The stator marked as a whole by 30 comprises the reel holder 32 that serves the reception of the kidney-shaped spools 34a to 34d. The spool holder 32 shows axially arranged slits 36 that serve the reception of the yokes marked by 38. The yokes form the four magnetic circuits with the four spools. The stator 30 furthermore comprises the return plate 40 that likewise shows slits 43 for receiving yokes 44.

The spools 34a to 34d arranged in the spool holder 32 are arranged in the spool holder such that two respective spools 34a and 34c and 34b and 34d are arranged directly diagonally opposite one another, that is at an angle of 180°, in the spool holder 32. The spools 34a, 34c and 34b, 34d disposed directly diagonally opposite one another have current applied simultaneously in an identical manner by the control. It is hereby achieved that no oscillating moments can be exerted on the rotor via the magnetic disk 16 of the rotor 10. If the control of the spool in accordance with the invention were not carried out, there would be the risk that the rotor would oscillate due to production tolerances, and here in particular in the bearing, with an application of current to the individual spools carried out one after the other, for example. Since now the spools 34a to 34d arranged diagonally opposite one another in the spool holder 32 have the same current applied simultaneously, such oscillating movements substantially do not occur. This also prevents the arising of resonances. This means that the damping of resonances is of decisive importance for the optimum operation of stepper motors because step losses due to the excitation of the oscillatory system comprising the combination of mechanical, electrical, and magnetic components can thereby be avoided, in particular at critical speeds. Finally, the microstep operation also serves the avoidance of resonances due to an approximately continuous application of current. While avoiding large abrupt jumps in the current development, high frequency excitations and resonances of the oscillatory system, and thus ultimately step losses, are avoided.

Figure 4:
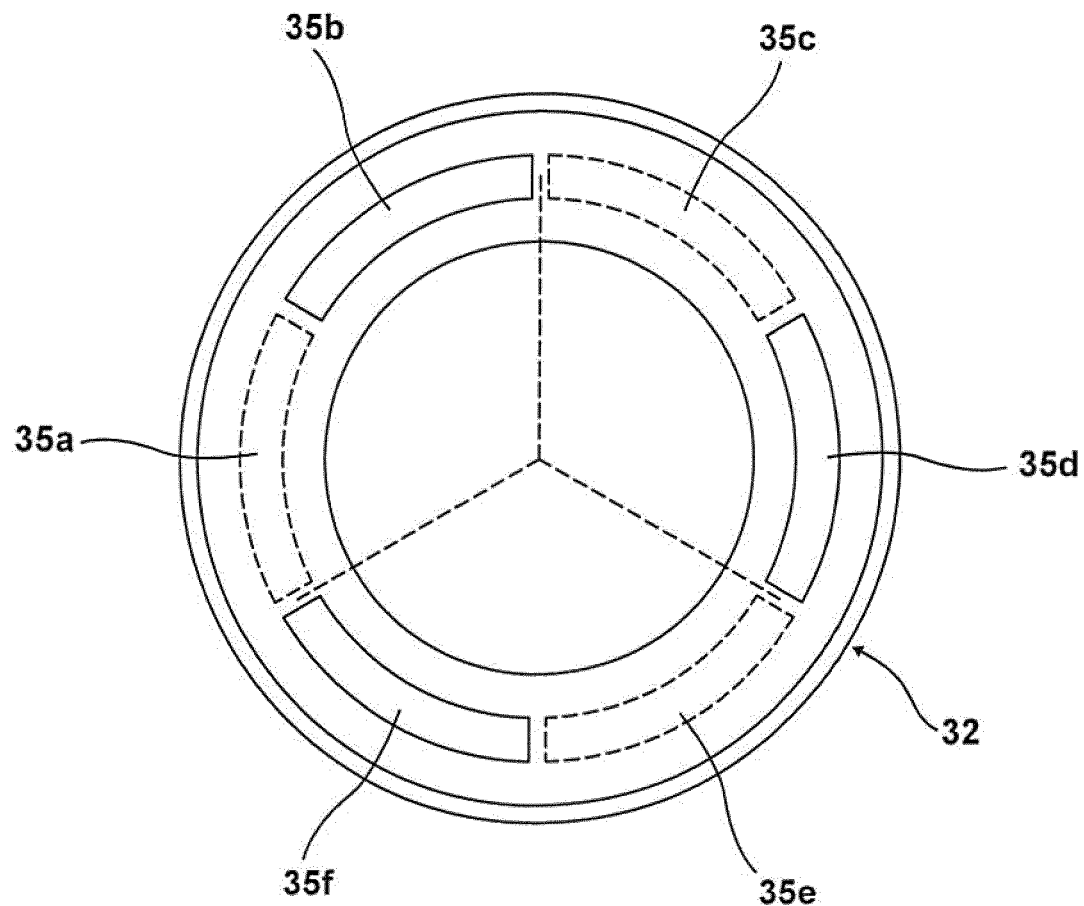
FIG. 4 schematically shows the arrangement of six spools in the spool holder.

In the schematic representation in accordance with FIG. 4 in which six spools 35a to 35f are arranged at an angle of 120° with respect to one another in the spool holder 32, the simultaneous and identical application of current takes place on a respective three of the spools 35a, 35c and 35e or of the spools 35b, 35d, and 35f arranged at an angle of 120° to avoid oscillating movements of the rotor.

The rotor 10 comprises the collet 12, with the collet 12 having the two thread guiding eyes 14 disposed diagonally opposite one another for guiding the leno threads. The thread guiding eyes 14 accept inserts 15 that serve as wear protection. The collet 12 furthermore supports the magnetic disk 16, with the magnetic disk having a plurality of magnetized segments 17 that are axially aligned on the circumference and that are each poled in opposite senses to one another. The collet 12 furthermore receives the bearing marked by 18 and having the bearing race 19, with the bearing 18 ensuring that the collet 12 can rotate relative to the spool holder 32.

REFERENCE NUMERAL LIST 1 electromotive apparatus for forming a leno selvage
10 rotor
12 collet
14 thread guiding eyes
15 insert
16 magnetic disk
17 magnetized segment
18 bearing
19 bearing race
20 leno threads
30 stator
32 spool holder of the stator
34a spool
34b spool
34c spool
34d spool
35a spool
35b spool
35c spool
35d spool
35e spool
35f spool
36 slit in the spool holder for receiving the yoke
38 yoke
40 return plate of the stator (spool holder)
42 slit in the return plate
44 yoke

The invention claimed is:

1. An electromotively operating apparatus for forming a leno selvage comprising:
a rotor having two thread guiding eyes arranged diagonally opposite one another in the rotor for the leno threads, the rotor having a magnetic disk, the magnetic disk having a plurality of alternately positively and negatively magnetized segments that are aligned in an axial direction of the rotor; and
a stator receiving the rotor, the stator having a spool holder and four individual and separate spools received by the spool holder, the stator further having axially disposed slits and yokes received in each slit, wherein the yokes and the four spools form four magnetic circuits parallel to the magnetic disk of the rotor, such that axial magnetic flux occurs between the magnetized segments of the magnetic disk and the magnetic circuits of the stator;
wherein a respective two spools of the four spools form a spool pair opposite to one another in the spool holder and the spools of a spool pair have current applied simultaneously and identically such that tilt moments exerted on the rotor by the spools cancel one another and the rotor thus has no force effect axially.

2. An electromotively operating apparatus in accordance with claim 1, further comprising spools that are kidney shape.

3. An electromotively operating apparatus in accordance with claim 1, wherein the spool holder of the stator is formed from an electrically non-conductive material, to avoid eddy currents.

4. An electromotively operating apparatus in accordance with claim 3, wherein the electrically non-conductive material is plastic.

5. An electromotively operating apparatus in accordance with claim 1, wherein the rotor has a collet for receiving the magnetic disk and a bearing, with the collet having the two thread guiding eye disposed diagonally opposite one another.

6. An electromotively operating apparatus in accordance with claim 5, wherein the thread guiding eyes have inserts for wear protection.

7. An electromotively operating apparatus in accordance with claim 5, wherein the bearing is a roller element bearing.

8. An electromotively operating apparatus in accordance with claim 1, further comprising a control, with a current application to the spools taking place by the control.

9. A projectile loom having at least one cutting lane for dividing the fabric web, comprising:
   at least one apparatus in accordance with claim 1 arranged in the at least one cutting lane.

10. A projectile loom in accordance with claim 9, wherein a warp beam of the projectile loom is configured as continuous.

11. An electromotively operating apparatus in accordance with claim 1, wherein the stator further comprises a return plate having slits for receiving additional yokes.

12. An electromotively operating apparatus for forming a leno selvage comprising:
   a rotor having two thread guiding eyes arranged diagonally opposite one another in the rotor for the leno threads, the rotor having a magnetic disk, the magnetic disk having a plurality of alternately positively and negatively magnetized segments that are aligned in an axial direction of the rotor; and
   a stator receiving the rotor, the stator having a spool holder and six individual and separate spools received by the spool holder, the stator further having axially disposed slits and yokes received in each slit, wherein the yokes and the six spools form six magnetic circuits parallel to the magnetic disk of the rotor, such that axial magnetic flux occurs between the magnetized segments of the magnetic disk and the magnetic circuits of the stator;
   wherein a respective three spools of the six spools are arranged at an angle of 120 degree with respect to one another in the spool holder and have current applied to the three spools simultaneously and identically such that tilt moments exerted on the rotor by the spools cancel one another and the rotor thus has no force effect axially.

\* \* \* \* \*